(12) United States Patent
Hafendorfer

(10) Patent No.: US 6,845,829 B2
(45) Date of Patent: Jan. 25, 2005

(54) UTILITY VEHICLE WITH FOOT-CONTROLLED MOBILITY

(76) Inventor: James T. Hafendorfer, 12202 Old Shelbyville Rd., Louisville, KY (US) 40243

( * ) Notice: Subject to any disclaimer, the term of this patent is extended or adjusted under 35 U.S.C. 154(b) by 31 days.

(21) Appl. No.: 10/407,639

(22) Filed: Apr. 4, 2003

(65) Prior Publication Data

US 2003/0213626 A1 Nov. 20, 2003

Related U.S. Application Data

(60) Provisional application No. 60/396,979, filed on Jul. 18, 2002, and provisional application No. 60/369,844, filed on Apr. 4, 2002.

(51) Int. Cl.$^7$ ............................................... B62D 11/00
(52) U.S. Cl. .................. 180/6.48; 180/315; 297/423.11
(58) Field of Search ............................... 180/6.48, 315, 180/317, 318, 321, 324, 334, 336, 305, 307, 308, 907, 908; 280/751, 755, 748; 56/14.7, 16.7; 297/423.11, 423, DIG. 4; 74/473.16, 512

(56) References Cited

U.S. PATENT DOCUMENTS

| | | | | |
|---|---|---|---|---|
| 4,020,916 A | * | 5/1977 | Noble | 180/65.1 |
| 4,475,613 A | * | 10/1984 | Walker | 180/22 |
| 4,538,695 A | * | 9/1985 | Bradt | 180/19.2 |
| 4,771,840 A | * | 9/1988 | Keller | 180/11 |
| 4,913,253 A | * | 4/1990 | Bowling | 180/210 |
| 6,047,749 A | * | 4/2000 | Lamb | 144/24.12 |
| 6,273,513 B1 | * | 8/2001 | Pope | 299/36.1 |
| 6,513,881 B2 | * | 2/2003 | Pope | 299/36.1 |
| 6,516,596 B2 | * | 2/2003 | Velke et al. | 56/14.7 |
| 6,591,593 B1 | * | 7/2003 | Brandon et al. | 56/10.6 |

FOREIGN PATENT DOCUMENTS

DE            3415524 A1 * 10/1985  ........... B62D/63/02

* cited by examiner

*Primary Examiner*—Lesley D. Morris
*Assistant Examiner*—Daniel Yeagley
(74) *Attorney, Agent, or Firm*—Stoll, Keenon & Park, LLP

(57) ABSTRACT

A utility vehicle with foot-controlled mobility is provided that includes a skeletal frame structure supporting a gasoline engine which utilizes a belt drive system to drive hydraulic motors with one hydraulic motor disposed at each rear wheel. The vehicle includes four wheel and tire assemblies, substantially at each corner with the rear wheels being driven and the front wheels being formed as casters for 360° rotation to provide a zero turning radius vehicle. The user sits upright in a manner wherein the user's legs are supported on pivotal leg support plates to allow the user to sit upright with legs directed down and away from the waist to allow the user to operate a hand-held implement. Both speed control and directional control are provided using pivotally mounted pedals with one pedal controlling each hydraulic motor. Movement of the pedals allows individual motor control to provide drive steering and speed control.

35 Claims, 5 Drawing Sheets

UTILITY VEHICLE WITH FOOT-CONTROLLED MOBILITY

PRIORITY

This application claims the benefit of U.S. Provisional application No. 60/369,844, filed Apr. 4, 2002 and U.S. Provisional application No. 60/396,979, filed Jul. 18, 2002.

BACKGROUND OF THE INVENTION

The present invention relates broadly to overland vehicles for general personal mobility and, more particularly, to a utility vehicle that provides hands free operation for use by operators of hand-held implements and others desiring or needing hands-free mobility in a vehicle.

Maintenance personnel and other workers generally require the use of their hands to perform work in some manner. In the past these workers have been limited to foot travel or travel in a vehicle with someone else at the controls. For example, inventory management in a large warehouse could more readily conducted if there were a utility vehicle available that could provide hands free operation so that the rider can have his or her hands free to operate bar code readers, clipboards or other devices requiring manual operation.

Lawn grooming and maintenance typically require grass cutting and trimming operations. Trimming, edging, debris clearance operations are typically done by hand-held implements such as string trimmers, edgers and blowers. These implements are generally carried by workers on foot. Walking, carrying and operating the implements can slow down a lawn grooming operation, especially when the facility undergoing care is large. Further, walking and carrying the implements can tire workers, requiring frequent breaks.

Military operations can also require hands-free personal mobility, especially in urban environments. Such personal mobility could free military personnel from heavy backpacks, and could carry extra weapons, ammunition, or communications equipment. Similarly, hunters could take advantage of the same features.

Accordingly, there exists a need for the utility vehicle to carry at least one person and provides hands-free operation to allow a worker or other rider to use their hands and furtherance of their job.

Further, there exists a need for a vehicle to carry operators of blowers, trimmers, edgers and other hand-held lawn care implements, as well as the implements themselves. Such a vehicle should provide hands-free operation wherein the vehicle may be operated in a manner that allows the worker to perform the cutting, trimming or edging operations while remaining mobile on the vehicle.

SUMMARY OF THE INVENTION

It is accordingly an object of the present invention to provide a utility vehicle capable of hands-free operation for use by workers carrying hand-held lawn grooming implements such as string trimmers, blowers and the like. The vehicle may be operated from a variety of seating positions, including a kneeling position, or an upright seating position. Accessories may also be included including a blower stand, a mower deck and a string-trimmer and implement rack. The vehicle of the present invention provides a zero turning radius and is controlled by a user's feet disposed on foot pedals.

It will be apparent to those skilled in the vehicular arts that the present invention is capable of a wide variety of uses and that the present description, with a focus on yard maintenance, should not be seen as limiting the present invention in any way.

To those ends a utility vehicle for land travel configured for foot-controlled mobility includes a frame; an apparatus for providing motive power mounted to the frame; at least two independently-operable drive wheels mounted to the frame for ground contact, the drive wheels being in communication with the apparatus for providing motive power for application of motive power through the ground contact for vehicle movement; and at least one ground support member mounted to the frame and spaced from the drive wheels for cooperation with the at least two independently-operable drive wheels for ground-support of the utility vehicle. The present utility vehicle further includes a control pedal apparatus movably mounted to said frame in operational communication with said at least two independently-operable drive wheels for controlling rotation thereof; a seat for user-body support mounted to the frame; and at least one user-body stabilizer mounted to the frame, and intersecting an imaginary horizontal plane disposed intermediate the seat and said control pedal apparatus.

It is preferable that the control pedal apparatus includes a first control pedal movably mounted to the frame in operational communication with a first of the at least two independently-operable drive wheels for controlling rotation thereof; and a second control pedal movably mounted to the frame in operational communication with a second of the at least two independently-operable drive wheels for controlling rotation thereof.

Preferably, the apparatus for providing motive power includes a first motor in operational communication with a first of the at least two drive wheels and a second motor in operational communication with a second of the at least two drive wheels. It is further preferred that the first motor and the second motor are each hydraulic motors and the apparatus for providing motive power further includes an engine in operational communication with the hydraulic motors for pump operation therefor. In another preferred embodiment of the present invention the first motor and the second motor are each electric motors and the apparatus for providing motive power further includes a battery.

It is preferred that the at least one ground support member includes at least one non-driven wheel mounted to the frame for rotation about a generally horizontal axis for ground contact rolling movement thereof. Further, the at least one non-driven wheel may be mounted to the frame for rotation about a generally vertical axis.

Preferably, the at least one user-body stabilizer includes two leg support members mounted to the frame. Further, the at least one user-body stabilizer may be pivotably mounted to the frame, which preferably includes at least two locations for mounting the at least one user-body stabilizer.

It is further preferred that the first control pedal and the second control pedal are each mounted to the frame for partial rotation about respective axes for selectively controlling clockwise and counterclockwise rotational movement of the first drive wheel and the second drive wheel respectively. Each pedal may include a first control surface formed as a substantially planar platform disposed at a substantially right angle with an imaginary line extending from each leg support member. Preferably, the first control pedal and the second control pedal each include a second control surface formed therein in spaced, facing relation with the first control surface. In addition, the first pedal and the second pedal may be mounted to the frame for partial rotation about respective axes for selectively controlling clockwise and counterclockwise rotational movement of the first drive wheel and the second drive wheel respectively.

It is preferred that the present invention include an implement storage assembly mounted to the frame. Further, an anti-tip assembly may be mounted to the frame and project rearwardly from the vehicle. Preferably, the anti-tip assembly includes at least one anti-tip member projecting outwardly from the vehicle in a manner for ground contact responsive to the vehicle tipping rearwardly.

Preferentially, the present invention includes an assembly for providing the vehicle with a substantially zero turning radius. It is preferred that the assembly for providing the vehicle with a substantially zero turning radius includes a dual pedal assembly for individually controlling rotational direction of each drive wheel and at least one non-driven wheel forming the ground support member and being mounted to the frame for rotation about a generally horizontal axis for ground contact rolling movement thereof and for rotation about a generally vertical axis.

The present invention may also be described in greater detail. In that regard, a utility vehicle for land travel configured for foot-controlled mobility includes a frame; two independently operable drive wheels mounted to the frame; an apparatus for providing motive power mounted to the frame including a first hydraulic motor in operational communication with a first of the two drive wheels and a second hydraulic motor in operational communication with a second of the two drive wheels, and an engine in operational communication with the first hydraulic motor and the second hydraulic motor for pump operation therefor; and two non-driven wheels mounted to the frame for rotation about generally horizontal axes for ground contact rolling movement thereof and for rotation about generally vertical axes for swiveling movement thereof, with the two non-driven wheels being spaced from the drive wheels for cooperation with the at least two drive wheels for ground-support of the utility vehicle. The present invention further includes a first control pedal in operational communication with a first of the at least two drive wheels with the first control pedal being mounted to the frame for partial rotation about an axis for selectively controlling clockwise and counterclockwise rotational movement of the first drive wheel; and a second control pedal in operational communication with a second of the at least two drive wheels with the second control pedal being mounted to the frame for partial rotation about an axis for selectively controlling clockwise and counterclockwise rotational movement of the second drive wheel; a seat for user-body support mounted to the frame; and at least one leg stabilizer member mounted to the frame, and intersecting an imaginary horizontal plane disposed intermediate the seat and at least one of the first control pedal and the second control pedal.

It is preferred that the first control pedal and the second control pedal each includes a control surface formed as a substantially planar platform disposed at a substantially right angle with an imaginary line extending from the at least one leg support member. Further, the first control pedal and the second control pedal may each include a second control surface formed therein in spaced, facing relation with the first control surface.

Preferably, an implement storage assembly is mounted to the frame. It is further preferred that the present invention includes an anti-tip assembly mounted to the frame and projecting rearwardly from the vehicle. It is further preferred that the assembly for providing the vehicle with a substantially zero turning radius includes a dual pedal assembly for individually controlling rotational direction of each drive wheel and at least one non-driven wheel forming the ground support member and being mounted to the frame for rotation about a generally horizontal axis for ground contact rolling movement thereof and for rotation about a generally vertical axis.

By the above, the present invention provides a utility vehicle that may be used in a variety of circumstances requiring hands free operation. The utility vehicle provides foot-controlled mobility, thereby leaving the hands and arms of an operator free to use tools or implements. The seat assembly of the present invention provides a chest pad that helps to stabilize the upper torso of the user, at least one and preferably two user body stabilizers are provided to allow a user's feet to be free for vehicle control use using the foot pedal(s).

DESCRIPTION OF THE PREFERRED EMBODIMENT

Figure 1:
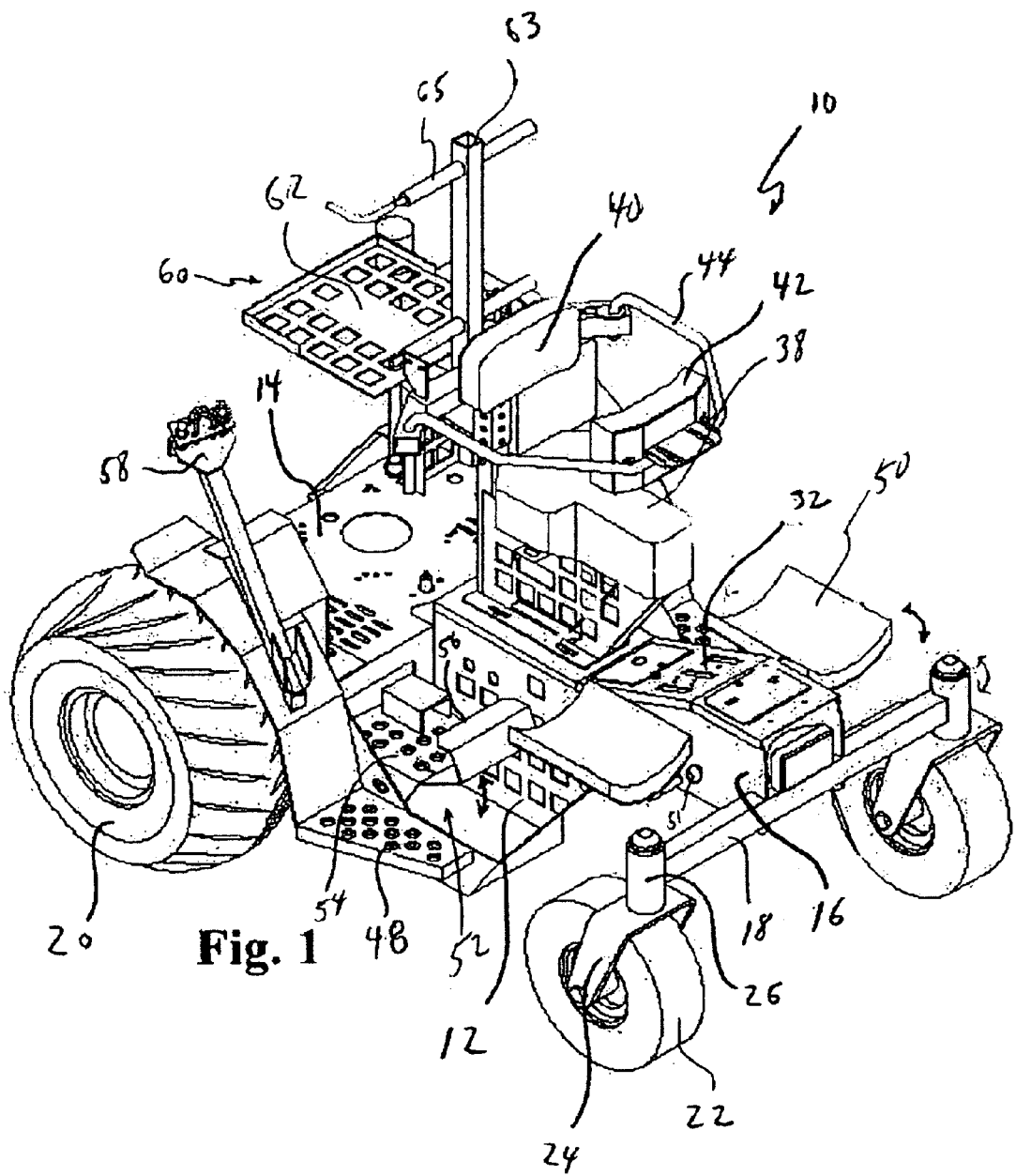
FIG. 1 is a perspective view of a utility vehicle with foot-controlled mobility according to a preferred embodiment of the present invention.

Turning now to the drawings and with particular reference to FIG. 1, a utility vehicle featuring foot-controlled mobility is illustrated generally at 10. The utility vehicle 10 includes a generally longitudinally oriented frame 12 on which several components are mounted. The frame 12 is preferably formed from steel. A body made of sheet material or molded fiberglass may be attached to the frame structure to enhance the overall appearance of the vehicle. The vehicle is ground-supported by four wheels and tires, 20, 22 as will be explained in greater detail hereinafter.

Figure 3:
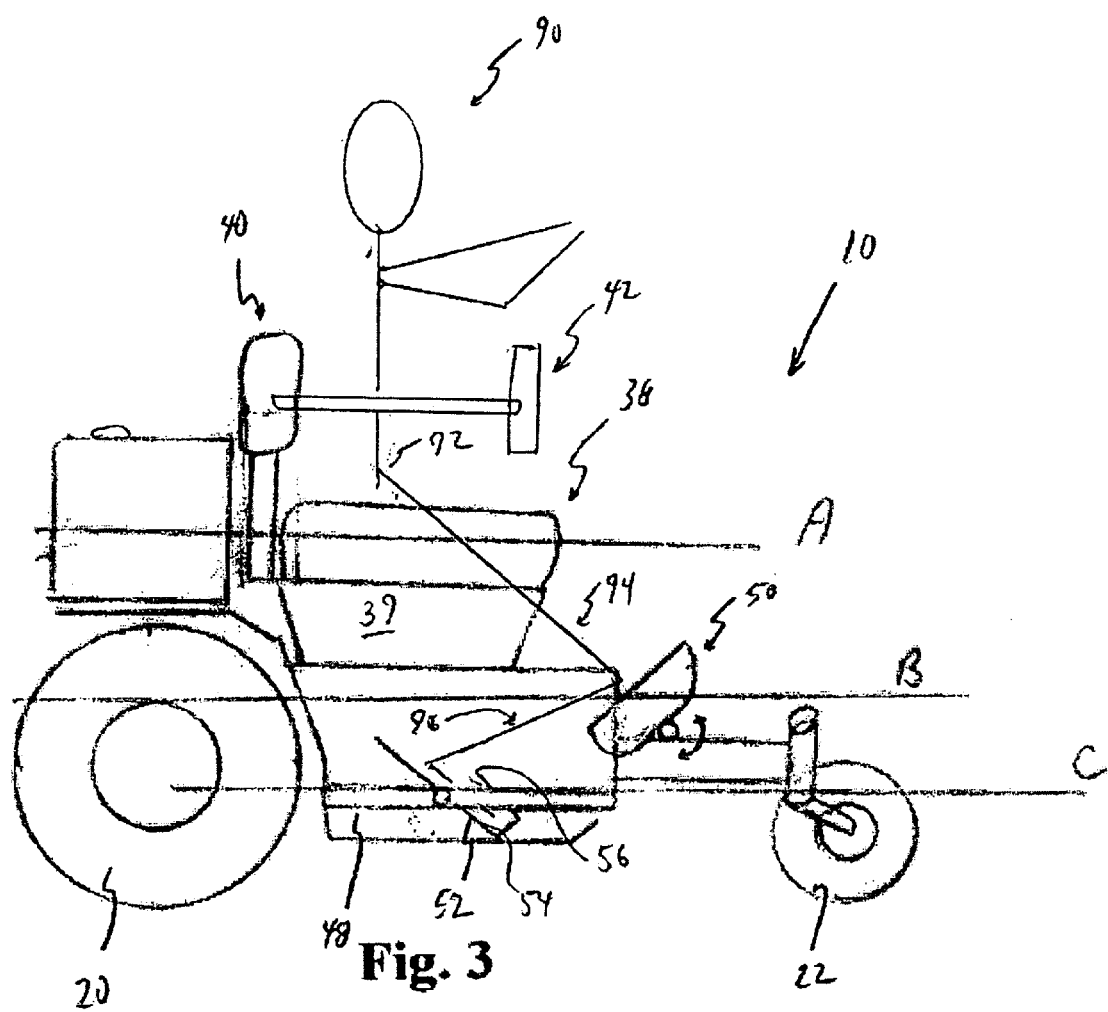
FIG. 3 is a diagrammatic side view of the vehicle illustrated in FIG. 1 showing the preferred seating position for a user.

The frame 12 defines a generally longitudally extending spine of the vehicle 10 on which a seat 38 user-body stabilizer 50 and pedals 52, 53 are mounted, as seen in FIGS. 1 and 3. A rearwardly extending engine platform 14 extends from the central frame 12. As seen in FIG. 3 and as will be explained in greater detail hereinafter, two rear wheel-and-tire assemblies 20 are in operational communication with two hydraulic motors (not shown in FIG. 1), which are in turn mounted to the frame 12. Front wheel and tire assemblies 22 are mounted to casters 24 which are in turn mounted each to a tubular element 26. A tubular element 26 is mounted on either end of a front support axle 18, mounted to a forwardmost position on said frame 12.

The casters 24 are mounted to the tubular elements 26 for 360° motion. Since the present invention provides a zero turning radius vehicle, the front wheels 22 act more as ground support than front steerable wheels as are common with many vehicles. It should be understood that while wheels 22 are shown as the front support members, skis, skids, conventional casters, or other elements may serve as front support members. For the primary purpose of the present invention, i.e., lawn maintenance, the wheels 22 with 360° rotation provide the best front support. Other structural features abound as seen in FIG. 1, which will be explained in greater detail hereinafter.

Figure 4:
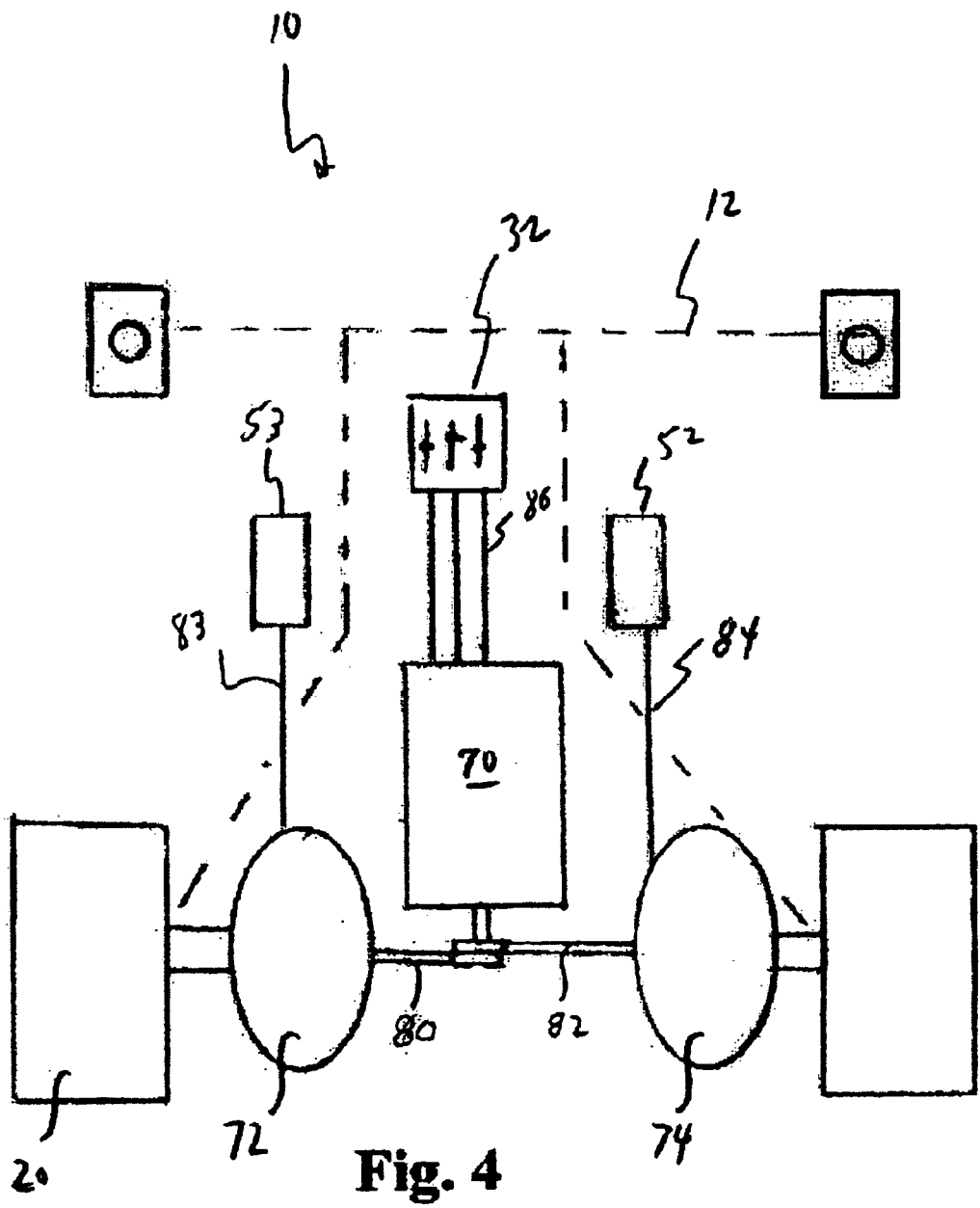
FIG. 4 is a diagrammatic view of the propulsion and control systems of the present invention.

As seen diagrammatically in FIG. 4, the utility vehicle 10 is powered by a vertical shaft, gasoline powered engine 70 although it is well within the skill of those in this art to utilize a horizontal shaft engine. A gas tank is mounted to a platform, which is, in turn, mounted to the frame and the gas tank is in fluid communication with the engine 70. The engine 70 includes a conventional pull start mechanism and a throttle is provided with the throttle control being convenient to the driver.

The two rear wheels 20 are mounted to axles which are, in turn, mounted to the rear portion of the frame 12. Each rear wheel is driven by a hydraulic motor 72, 74 as seen in FIG. 4. While two motors are preferred, it is possible to use a single hydrostatic transmission to drive both wheels, and it is not beyond the capabilities of those skilled in the art to devise a mechanism for accomplishing a single-hydraulic-unit drive system. The twin hydraulic motors 72, 74 are each individually belt driven by the gasoline engine 70 with belt drive assemblies 80, 82. The engine 70 pressurizes the fluid within each individual hydraulic motor 72, 74 so that fluid control determines the instantaneous speed of the vehicle. The result is a dual throttle with the gas motor being throttled at its carburetor in a "set and forget" manner with the direction and speed of the vehicle 10 being ultimately controlled by fluid flow within the hydraulic motors 72, 74. Control of this fluid flow will be explained in greater detail hereinafter. It should be noted that while a gas motor is preferable, an electric motor may be used to drive the hydraulic system.

It should also be noted that under certain circumstances, electric motors may be substituted for hydraulic drive motors with a battery supplying the power otherwise provided by the gas engine. The battery may be a large storage battery, such as those used in golf carts, or a smaller battery used in conjunction with a gas engine driven generator for charging, in a manner similar to a diesel submarine. These and other power options should be apparent to those skilled in the art of small tractor-like vehicles without undue experimentation.

The 360° rotation capabilities of the casters 22, combined with drive steering allow the vehicle an essentially zero degree turning radius. That is, the vehicle can move 360° while being driven by one rear wheel, while pivoting on the non-driven wheel which will be explored in greater detail presently.

Directional control and speed of the vehicle, i.e. mobility is controlled by the operator using his or her feet in manipulating two foot pedals 52, 53 as seen in FIGS. 1–4. It is possible to use a single pedal by varying pedal the required movement associated with machine operation. Each foot pedal 52, 53 independently operates one of the hydraulic drive motors 72, 74. The pedals 52, 53 are each pivotally mounted to the frame 12 at a downward angle which will match the natural position of a user seated on the vehicle as seen in FIG. 3 and as will be explained in greater detail presently.

Each pedal 52 53 is connected to its respective hydraulic motor 72, 74 by a mechanical linkage such as a cable and cam linkage shown diagrammatically at 83, 84 in FIG. 4. Therefore, movement of a pedal 52, 53 in a downward, forward motion causes the fluid to flow within a hydraulic motor 72, 74 in such a direction as to propel the vehicle 10 forwardly. Similarly, a heel-down or rearward motion of the pedal 52, 53 causes the fluid to flow within a hydraulic motor 72, 74 in a manner to direct the vehicle 10 in reverse. A neutral position is provided wherein the hydraulic motors 72, 74 experience no fluid flow and the vehicle remains stationary. The use of a cable and cam system for throttle control allows the cable to roll off the cam in such a manner as to reduce or eliminate vehicle jerk which may otherwise result from sudden pedal movement in either direction. A piston and cylinder damping arrangement may be provided, for enhanced pedal control. As with most control systems, the present invention should not be limited by any sort of linkage and even an electronic, fly-by-wire type system could be used.

The seating position of a user 90 is important in that the vehicle 10 may be operated effectively while allowing the user 90 to operate a lawn implement, or other tool as seen in FIG. 3. In one preferred seating position, the upper legs or thighs 94 of a user can be directed downwardly and away from the user's waist 92 to provide a natural use position for both vehicle control and the lawn implement.

Figure 2:
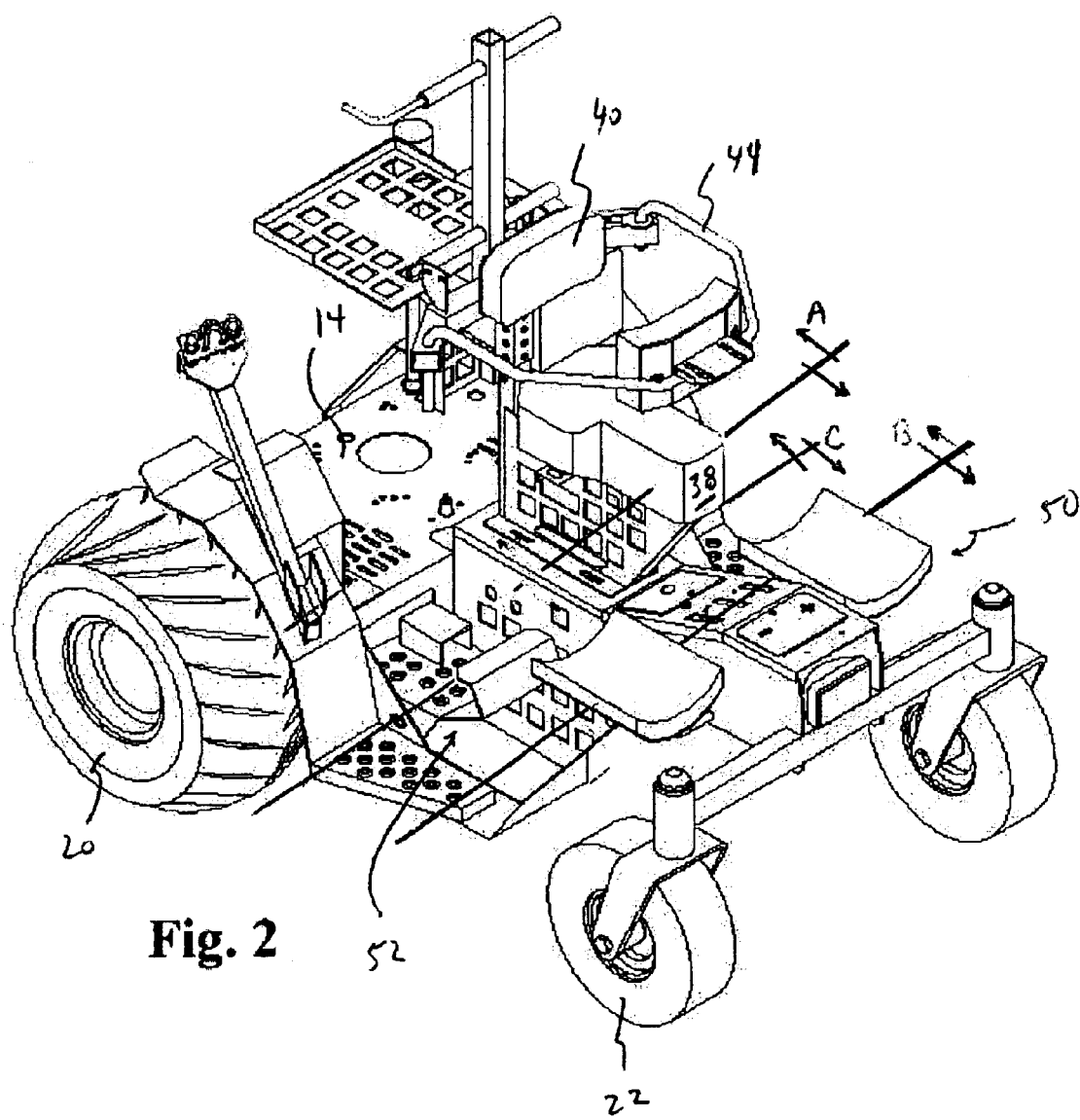
FIG. 2 is a perspective view of the utility vehicle illustrated in FIG. 1, illustrating planes of interest with respect to the present invention.

To that end, the user 90 is supported on a seat 38. The seat 38 is attached to a mounting structure, 39 which is, in turn, is attached to a generally central portion of the frame 12. As seen in FIGS. 1–2, the seat 38 includes a generally T-shaped platform disposed in a generally horizontal manner. A vertical back support 40 extends upwardly from the rearward portion of the T-shaped seat 38. The shape of the seat 38 helps to position the user 90 with respect to the user-body stabilizers 50.

In order to provide free use of an operators feet to control the vehicle 10 in a safe manner while the user remains upright with hands free, another portion of the users body should be stabilized to, essentially, take their weight off their feet by finding other support objects.

According to the present invention, a user body stabilizer is illustrated at 50 in FIGS. 1–3. The user-body stabilizer 50 in the present case consists of a pair of shin supports that are rotatably mounted to the forward projecting portion of the front 16 of the frame 12. It is contemplated that the invention use such shin supports as a user-body stabilizer, however, it will be readily seen by those skilled in the art that a single structure could provide similar use characteristics and the user-body stabilizer 50 should be used to contact some portion of the users body in order to provide stability while the feet are free. According to the preferred embodiment of the present invention, the shin supports, or user-body stabilizer 50 exists at a position intermediate natural support areas, i.e., the feet and the seat of the user. This is illustrated in FIGS. 2 and 3. There it can be seen that the rotational axis of the pedals 52, 53 extends generally horizontally in a lower plane C. The seat 38 also exists with respect to the horizontal plane A. The body stabilizers 50 are rotatably disposed at a location through horizontal plane B which extends intermediate horizontal plane C and horizontal plane A. By locating the user-body stabilizer 50 in various positions intermediate horizontal plane A and horizontal plane C the stance of the user may be altered. The basic function of the user-body stabilizer 50 is to provide sufficient stability for the user such that the feet remain free to operate the pedals 52, 53 using both control surfaces 54, 56 to effect forward, backward, or turning motion of the utility vehicle 10.

As seen in FIG. 3, the user's shins 96 are supported by two stabilizers 50 which are curved, padded members pivotally mounted to the frame 12 adjacent the front wheels 22.

As seen in FIGS. 1–3, a front support bar 44 is pivotably mounted to the frame 12 for movement in and out of a relationship whereby the bar prohibits the user from pitching forward off the seat thus enhancing free use of the hands. As seen in FIG. 1, the front support bar 44 is pivotably mounted to the frame 12 adjacent the seat 38 and includes a channel that supports a chest pad 42. The support bar 44 moves through an approximately 180-degree horizontal arc with one end pivotably mounted to the frame 12. It should be noted that padding in the chest pad 42 may be provided in generally any form necessary to accommodate a user. The front support bar 44 may pivot away from the user for ingress to and egress from the seat. The support bar 44 latches in place using a conventional latching arrangement.

There are several other safety features associated with the vehicle. A hand brake may be provided which will lock the vehicle in place while the user dismounts or stands on support platforms 48 projecting outwardly from the side of the vehicle as seen in FIGS. 1–2. These support platforms 48 allow the user to stand, if necessary, or to otherwise support the user with his feet off the pedals 52, 53. The handbrake, can also function at a neutral position to disengage the hydraulic motors 72, 74 so that the vehicle may free wheel, such as when being pushed as may be necessary to put the vehicle on a trailer for transportation.

The engine 70 controlled with a control panel 32 through control lines 86 as seen in FIG. 4. The control panel 32 includes a throttle, a choke and a keyed switch which may be used to turn the vehicle off if necessary. Once the engine 70 is running with the throttle set, no more control other than the ignition is required for the engine. Once it is running and at speed, the hydraulic motors 72, 74 are used to control vehicle movement through the foot pedals 52, 53.

Other safety features include a so-called "dead man" switch (not shown) which will disable the vehicle if the rider were to fall off, or otherwise abandon a moving vehicle. This switch may be attached to either or both of the front support bar 44 and the seat 38. Further, an engine kill switch (not shown) will be provided so that the user may turn the engine off in an emergency, if necessary.

A support rack 58 is provided for carrying string trimmers or other lawn maintenance implements or to support a lawn implement while the user mounts, dismounts or stands on the platforms.

Figure 5:
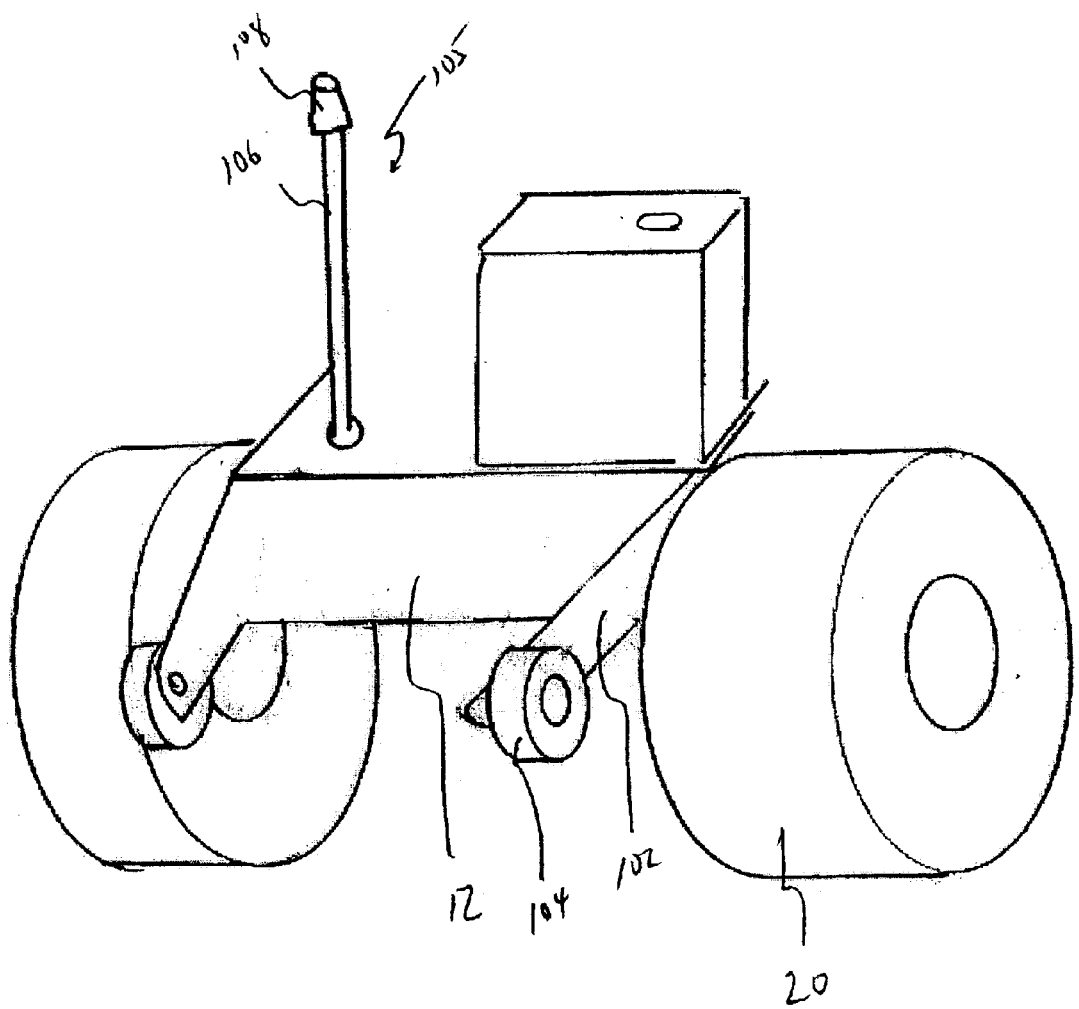
FIG. 5 is a diagrammatic view of the anti-tip assembly according to the present invention.

With reference to FIG. 5, an anti-tip mechanism is illustrated. The anti-tip mechanism includes generally rearwardly and downwardly extending support bars 102 with a wheel 104 disposed at the distal end of each support bar 102. If the vehicle tips rearwardly or raises the front wheels, the anti-tip wheels 104 should contact the ground and prevent the vehicle 10 from overturning rearwardly. In addition, a hazard beacon 105 is provided as a lamp 108 at the end of an upstanding pole 106. Optionally, the beacon may be operated when the vehicle is in use, thereby adding to the visibility of the vehicle and adding to the safety of the user and those around the user.

The present invention also provides a blower support stand, 60 as seen in use in FIG. 2, including a generally horizontal platform 62 and a generally vertically extending support member 63. A cylindrical mounting post, or shank is provided at one corner of the device and projects downwardly for operational receipt in a corresponding cylindrical mounting receiver. The platform 62 and vertically extending support member 63, may then be rotated about an axis defined by the mounting post in registry with the receiver.

The blower stand 60 pivots between an access position adjacent the user and a use position behind the seat back 40. It is preferred that the blower stand 60 be mounted directly behind an operator so that while the burden of carrying the blower is alleviated, the blower remains in a familiar position to the user.

As seen in FIGS. 1–2, a generally horizontally extending platform 62 is sized to hold a conventional blower and has thereattached a vertically extending support member 63. The vertically extending support member 63 includes two horizontally projecting, spaced rods 65 that serve the operator by providing a mounting location for the conventional backpack-like straps of the blower. This eliminates the need to modify the blower for mounting to the blower support stand 60. It should be noted that the preferred configuration includes a substantially horizontally-extending platform and some form of vertical support member, however, it will be understood by those skilled in the art that several configurations of the basic device are possible. For example, a generally planar vertical support member may be provided with openings therein to receive the blower straps. Ultimately, straps could be attached to the vertically extending support member for engagement with the blower. These and other variations will be apparent to those skilled in the art.

In order to operate the blower when it is mounted on the blower stand 60, a remote throttle is provided, and is mounted for convenient use by the operator of the vehicle 10.

In operation of the vehicle 10, a user 90 will mount the vehicle by climbing onto the seat 38 as seen in FIG. 3. The user 90 will position his or her shins 96 in the user-body stabilizers 50 that are padded and pivotally mounted to allow ease of use. The user's feet contact the pedals 52, 53. The front safety bar 42 is then moved into place and the user may access the lawn implement for lawn maintenance as seen in FIGS. 1 and 2.

Prior to mounting, the user should have started the engine 70. It is contemplated that an electric start provision may be provided so that the user may start and stop the engine 70 while mounted on the seat 38.

In order to propel the vehicle forwardly, the user rocks both pedals 52, 53 forwardly in a toe-down manner which will allow fluid flow to the hydraulic motors 72, 74 to propel the vehicle forwardly. Similarly, simultaneously rocking both pedals backward in a heel-down manner will cause the hydraulic motors 72, 74 to drive the vehicle 10 in reverse. The speed of the vehicle 10 is proportional to the arcuate length of pedal travel. If one or the other pedal is rocked forwardly, while the other pedal remains in a neutral position, the vehicle will turn with a zero turning radius with the free wheeling casters allowing the single driven rear wheel to propel the vehicle in a circle. Further, if one pedal is moved forwardly while the other pedal is moved back, the vehicle will turn even more sharply. It is contemplated that the use of the cable control system with a roll-off cam feature will eliminate any sort of jerk that could occur when causing the vehicle to move in either direction.

A blower may be mounted to the blower stand 60 with the straps of the blower. Once the operator has mounted the vehicle seat 38, he or she can reach behind the seat 38 and move the blower through a 180 degree arc to ultimately end up in a user access position, adjacent the user. The blower can then be started while the user is seated on the seat 38 and then rotated into a latched configuration. The user may then remove the hose and nozzle and operate the blower from the vehicle, controlling the throttle with the remote throttle.

By the above, the present invention provides a utility vehicle having hands-free operation and a zero turning radius that positions the user in a manner to allow effective use of a hand-held yard implement. Further, the present invention provides a blower stand for a utility vehicle that positions the user and the blower in a mutually compatible position to allow effective use of the blower while operating the vehicle.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

I claim:

1. A utility vehicle configured for foot-controlled mobility comprising:
   a frame;
   an apparatus for providing motive power mounted to said frame;
   at least two independently-operable drive wheels mounted to said frame for ground contact, said drive wheels being in communication with said apparatus for providing motive power for application of motive power through said ground contact for vehicle movement;
   at least one ground support member mounted to said frame and spaced from said at least two independently-operable drive wheels for cooperation therewith for ground-support of said utility vehicle;
   a control pedal apparatus movably mounted to said frame in operational communication with said at least two independently-operable drive wheels for controlling rotation thereof;
   a seat for user-body support mounted to said frame; and
   at least one user-body stabilizer mounted to said frame, and intersecting an imaginary horizontal plane disposed intermediate an imaginary horizontal plane through said seat and an imaginary horizontal plane through at least one of said control pedal apparatus.

2. A utility vehicle according to claim 1 wherein said pedal apparatus includes a first control pedal movably mounted to said frame in operational communication with a first of said at least two independently-operable drive wheels for controlling rotation thereof; and a second control pedal movably mounted to said frame in operational communication with a second of said at least two independently-operable drive wheels for controlling rotation thereof.

3. A utility vehicle according to claim 1 wherein said apparatus for providing motive power includes a first motor in operational communication with a first of said at least two independently-operable drive wheels and a second motor in operational communication with a second of said at least two independently-operable drive wheels.

4. A utility vehicle according to claim 3 wherein said first motor and said second motor are each pump-driven hydraulic motors and said apparatus for providing motive power further includes an engine in operational communication with said hydraulic motors for pump operation therefor.

5. A utility vehicle according to claim 3 wherein said first motor and said second motor are each electric motors and said apparatus for providing motive power further includes a battery.

6. A utility vehicle according to claim 1 wherein said at least one ground support member includes at least one non-driven wheel mounted to said frame for rotation about a generally horizontal axis for ground contact rolling movement thereof.

7. A utility vehicle according to claim 6 wherein said at least one non-driven wheel is mounted to said frame for rotation about a generally vertical axis.

8. A utility vehicle according to claim 1 wherein said at least one ground support member includes two non-driven wheels mounted to said frame for rotation about generally horizontal axes for ground contact rolling movement thereof.

9. A utility vehicle according to claim 8 wherein said non-driven wheels are mounted to said frame for rotation about generally vertical axes.

10. A utility vehicle according to claim 1 wherein said at least one user-body stabilizer includes two leg support members mounted to said frame.

11. A utility vehicle according to claim 10 wherein said leg support members are pivotably mounted to said frame.

12. A utility vehicle according to claim 10 wherein said frame includes at least two locations for mounting said at least one user-body stabilizer.

13. A utility vehicle according to claim 10 wherein said first control pedal and a second control pedal are each mounted to said frame for partial rotation about respective axes for selectively controlling clockwise and counterclockwise rotational movement of a first drive wheel and a second drive wheel respectively, and wherein each said pedal includes a first control surface formed as a substantially planar platform disposed at a substantially right angle with an imaginary line extending from each said leg support member.

14. A utility vehicle according to claim 13 wherein said first control pedal and said second control pedal each include a second control surface formed therein in spaced, facing relation with said first control surface.

15. A utility vehicle according to claim 1 wherein a first pedal and said second pedal are mounted to said frame for partial rotation about respective axes for selectively controlling clockwise and counterclockwise rotational movement of a first independently-operable drive wheel and a second independently-operable drive wheel respectively.

16. A utility vehicle according to claim 15 wherein said first control pedal and said second control pedal each include a first control surface formed therein in spaced, facing relation with a second control surface.

17. A utility vehicle according to claim 1 and further comprising a user-body restraint member mounted to said frame and movable between a first position disposed in facing relation with an imaginary vertical plane extending through said seat and a second position spaced from said first position.

18. A utility vehicle according to claim 1 and further comprising an implement storage assembly mounted to said frame.

19. A utility vehicle according to claim 1 and further comprising an anti-tip assembly mounted to said frame and projecting rearwardly from said vehicle.

20. A utility vehicle according to claim 19 wherein said anti-tip assembly includes at least one anti-tip member projecting outwardly from said vehicle in a manner for ground contact responsive to said vehicle tipping rearwardly.

21. A utility vehicle according to claim 1 and further comprising an assembly for providing said vehicle with a substantially zero turning radius.

22. A utility vehicle according to claim 21 wherein said assembly for providing said vehicle with a substantially zero turning radius includes a dual pedal assembly for individually controlling rotational direction of each said independently-operable drive wheel and at least one non-driven wheel forming said ground support member and being mounted to said frame for rotation about a generally horizontal axis for ground contact rolling movement thereof and for rotation about a generally vertical axis.

23. A utility vehicle configured for foot-controlled mobility comprising:
  a frame;
  two independently operable drive wheels mounted to said frame;
  an apparatus for providing motive power mounted to said frame including a first hydraulic motor in operational communication with a first of said two independently-operable drive wheels and a second hydraulic motor in operational communication with a second of said two independently-operable drive wheels, and an engine in operational communication with said first hydraulic motor and said second hydraulic motor for pump operation therefor;
  two non-driven wheels mounted to said frame for rotation about generally horizontal axes for ground contact rolling movement thereof and for rotation about generally vertical axes for swiveling movement thereof, with said two non-driven wheels being spaced from said drive wheels for cooperation with said at least two independently-operable drive wheels for ground-support of said utility vehicle;
  a first control pedal in operational communication with said first of said at least two independently-operable drive wheels with said first control pedal being mounted to said frame for partial rotation about an axis for selectively controlling clockwise and counterclockwise rotational movement of said first independently-operable drive wheel; and
  a second control pedal in operational communication with said second of said at least two independently-operable drive wheels with said second control pedal being mounted to said frame for partial rotation about an axis for selectively controlling clockwise and counterclockwise rotational movement of said second independently-operable drive wheel,
  a seat for user-body support mounted to said frame;
  a user-body restraint member mounted to said frame and movable between a first position disposed in facing relation with an imaginary vertical plane extending through said seat and a second position spaced from said first position; and
  at least one leg stabilizer member mounted to said frame, and intersecting an imaginary horizontal plane disposed intermediate an imaginary horizontal plane through said seat and an imaginary horizontal plane through at least one of said first control pedal and said second control pedal.

24. A utility vehicle according to claim 23 wherein said first control pedal and said second control pedal each includes a control surface formed as a substantially planar platform disposed at a substantially right angle with an imaginary line extending from said at least one leg support member.

25. A utility vehicle according to claim 23 wherein said first control pedal and said second control pedal each include a first control surface formed therein in spaced, facing relation with a second control surface.

26. A utility vehicle according to claim 23 and further comprising an implement storage assembly mounted to said frame.

27. A utility vehicle according to claim 23 and further comprising an anti-tip assembly mounted to said frame and projecting rearwardly from said vehicle.

28. A utility vehicle according to claim 27 wherein said anti-tip assembly includes at least one anti-tip member projecting outwardly from said vehicle in a manner for ground contact responsive to said vehicle tipping rearwardly.

29. A utility vehicle according to claim 23 and further comprising an assembly for providing said vehicle with a substantially zero turning radius.

30. A utility vehicle according to claim 29 wherein said assembly for providing said vehicle with a substantially zero turning radius includes a dual pedal assembly for individually controlling rotational direction of each said independently-operable drive wheel and said two non-driven wheels.

31. A utility vehicle configured for foot-controlled mobility comprising:
  a frame;
  an apparatus for providing motive power mounted to said frame;
  at least two independently-operable drive wheels mounted to said frame for ground contact, said drive wheels being in communication with said apparatus for providing motive power for application of motive power through said ground contact for vehicle movement;
  at least one ground support member mounted to said frame and spaced from said at least two independently-operable drive wheels for cooperation therewith for ground-support of said utility vehicle;
  a seat for user-body support mounted to said frame; and
  a control pedal apparatus movably mounted to said frame in operational communication with said at least two independently-operable drive wheels, said control pedal apparatus including a first control pedal in operational communication with a first drive wheel for controlling speed and direction of rotation thereof and a second control pedal in operational communication with a second drive wheel for controlling speed and direction of rotation thereof.

32. A utility vehicle according to claim 31 wherein said first control pedal and said second control pedal are pivotably mounted to said frame for bidirectional rotational movement about an axis from a neutral position, and are configured for causing rotation of each respective drive wheel in a direction so as to induce forward motion of said vehicle when moved in a first direction and for causing rotation of each respective drive wheel in a direction so as to induce rearward motion of said vehicle when said moved in a second direction.

33. A utility vehicle according to claim 32 wherein said first control pedal and said second control pedal are each configured for individually controlling respective drive wheel rotational speed, said drive wheel rotational speed being proportional to an amount of pedal displacement with respect to said neutral position.

34. A utility vehicle according to claim 32 wherein said first pedal and said second pedal each include a heel area and a toe area, and are each configured for causing rotation of a respective drive wheel commensurate with forward motion of said vehicle when said toe area is depressed and for causing rotation of a respective drive wheel commensurate with rearward motion of said vehicle when said heel area is depressed.

35. A utility vehicle according to claim 32 and further comprising at least one user-body stabilizer mounted to said frame, and intersecting an imaginary horizontal plane disposed intermediate an imaginary horizontal plane through said seat and an imaginary horizontal plane through at least one of said first control pedal and said second control pedal.

* * * * *